United States Patent [19]
Apostoleris

[11] 3,873,864
[45] Mar. 25, 1975

[54] TWO-PIECE DYNAMOELECTRIC MACHINE HOUSING

[75] Inventor: Theodore G. Apostoleris, Ann Arbor, Mich.

[73] Assignee: Ford Motor Company, Dearborn, Mich.

[22] Filed: Dec. 26, 1973

[21] Appl. No.: 428,527

[52] U.S. Cl............... 310/89, 310/90, 310/154
[51] Int. Cl. ........................................ H02k 5/04
[58] Field of Search ........ 310/89, 90, 154, 43, 239, 310/152, 155, 50, 47

[56] References Cited
UNITED STATES PATENTS

| | | | |
|---|---|---|---|
| 3,121,813 | 2/1964 | Pratt et al. | 310/50 |
| 3,766,418 | 10/1973 | Apostoleris | 310/154 |
| 3,789,250 | 1/1974 | Macoit et al. | 310/154 |

Primary Examiner—Donovan F. Duggan
Attorney, Agent, or Firm—Robert A. Benziger; Keith L. Zerschling

[57] ABSTRACT

The present invention is directed to a two-piece dynamoelectric machine housing which is separated along a plane which includes the axis of rotation of the rotor of the dynamoelectric machine. The housing is readily formable from suitable plastic material by conventional plastic molding techniques and provides greatly improved ease of dynamoelectric machine assembly. The improved ease of assembly is provided by convenient positional placement of the bearing structure between two ridges within one piece of the housing. Final location is assured by the encapsulating effect of complementary ridges upon the full assembly of the housing. The structure further provides for convenient addition of the electrical brushes through suitably provided structure which opens on the exterior portion of the housing thereby permitting the brushes and the brush biasing structure to be added to the dynamoelectric machine in a convenient fashion after assembly of the housing about the rotor and armature bearing structure. The structure also accommodates an exteriorly placed permanent magnet stator field generating structure. The housing further includes plastic structure for receiving the electrical leads, flange structure for convenient mounting and an integrally formed cooling air passage duct.

5 Claims, 5 Drawing Figures

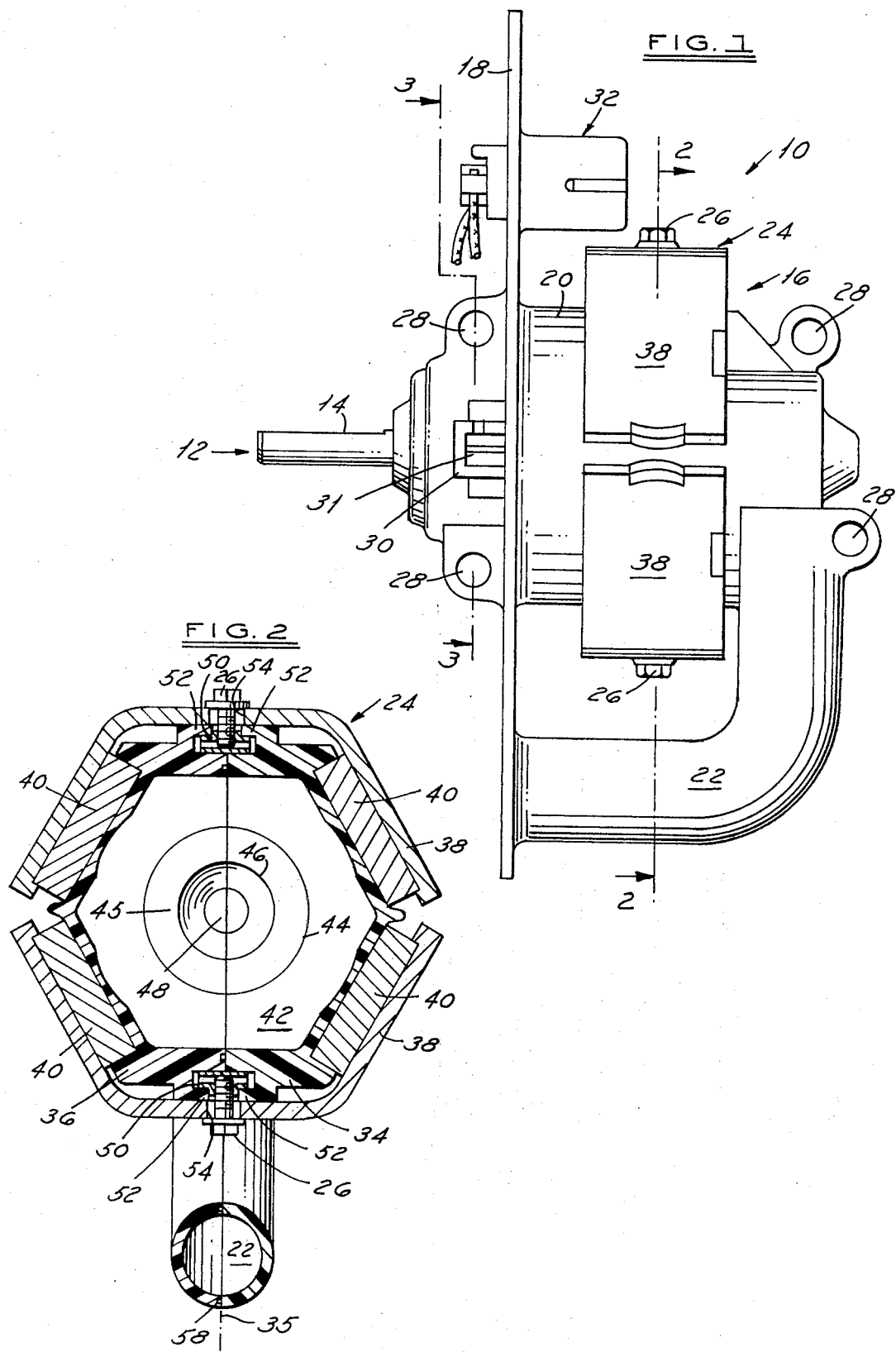

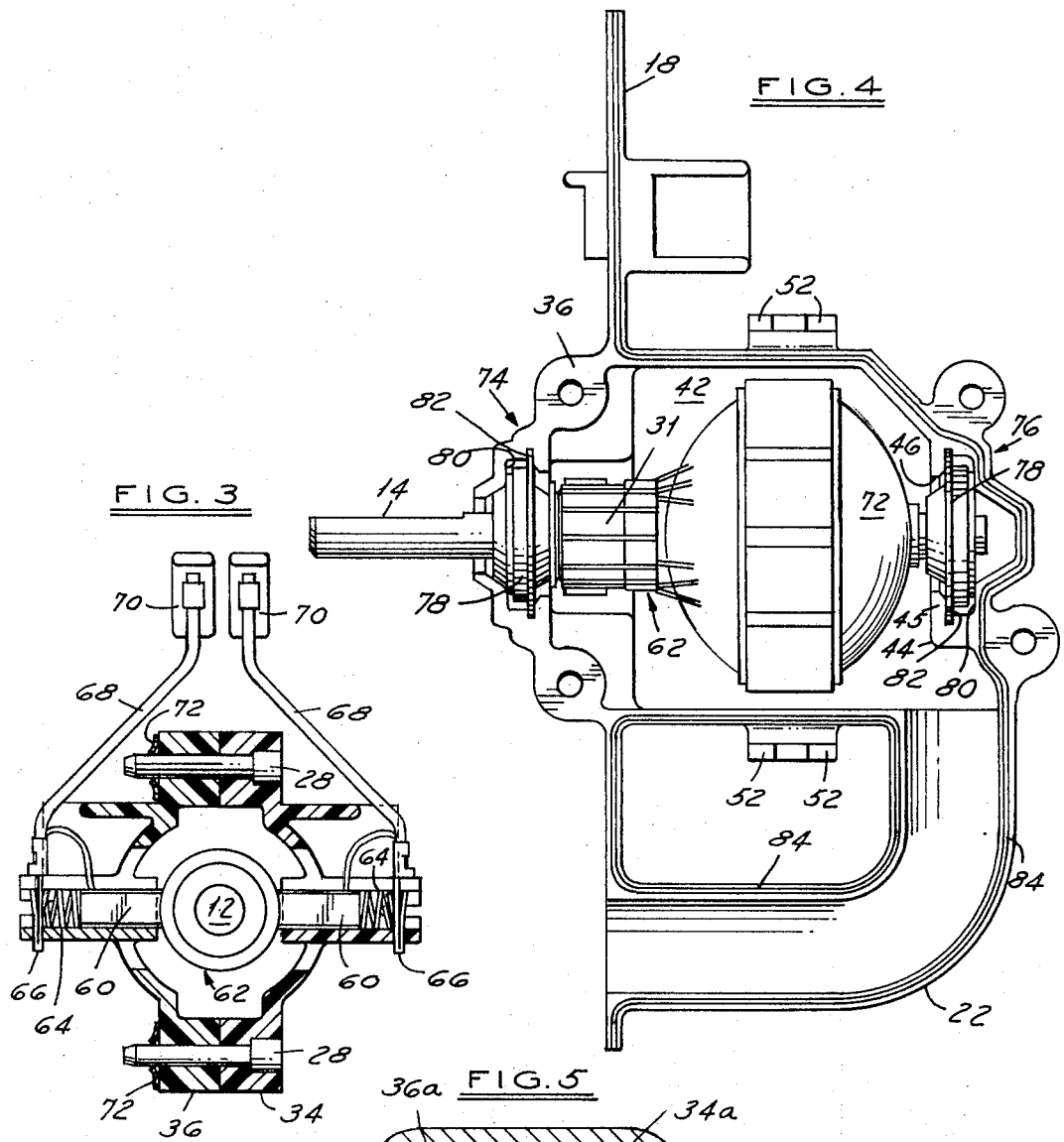

TWO-PIECE DYNAMOELECTRIC MACHINE HOUSING

BACKGROUND OF THE INVENTION

1. Field of the Invention

The present invention is directed to the field of dynamoelectric machines and particularly to that portion of the above noted field which is concerned with the housing structure for such machines. More particularly still, the present invention is directed to that portion of the above noted field which is concerned with the formation of housing structures for dynamoelectric machines in which the stator field generating means will be located generally exteriorly to the housing structure.

2. Description of the Prior Art

Dynamoelectric machine housings have been made from a variety of materials and in a variety of configurations. Recently, however, plastics have been gaining increased popularity as housing materials for dynamoelectric machines due to their low cost, high impact strength, ease of forming and the capability of selecting a wide variety of electrical characteristics. In particular, in the field of permanent magnet dynamoelectric machines wherein great advantage can be obtained by interposing a barrier between the permanent magnets and the rotor, dynamoelectric machines have been constructed having a plastic housing with the permanent magnet stator field producing structure situated around the periphery of the housing. Examples of this structure may be found, for example, in copending commonly-assigned patent application Ser. No. 223,636, "Permanent Magnet Dynamoelectric Machine" of which I am a co-inventor and in my U.S. Pat. No. 3,766,418 "Permanent Magnet Dynamoelectric Machine Flux Path Assembly." Such structures normally provide a plastic dynamoelectric machine housing which has a unitary, generally cup-shaped, rotor receiving structure which is closed at one end. The other end is normally sealed by an end plate. A bearing for receipt of one end of the rotor shaft is normally pressed into the rear wall portion of the closed end of the cup-shaped portion and a similar bearing is provided in the end plate. Insertion of these bearings is a problem in view of the fact that the bearings must be permanently retained and this is usually accomplished by a special retainer ring having sharpened projections adapted for gripping the sides of a cylindrical housing. In use, these retainers have been known to become dislodged or to move slightly allowing the bearing to shift and greatly increasing the wear at the bearing end armature shaft interface. My pending patent application Ser. No. 306,778, filed Nov. 15, 1972 and titled "Dynamoelectric Machine End Plate And Mounting Means" describes the problem of mounting a bearing within a plastic end plate where the bearing must accept high axial loading. The problem and solution presented in application Ser. No. 306,778 are illustrative of the general problem encountered in dynamoelectric machine housings formed of a cup-shaped rotor receiving portion and sealed by an end plate.

A further problem encountered with these prior art housing structures is the difficulty of providing a cooling flow of air over the rotor structure particularly when the dynamoelectric machine is utilized as a fan motor. This problem results primarily from the complexity involved in molding the unitary cup-shaped portion of the plastic housing. In order to provide sufficient flow of cooling air, the cup-shaped housing is generally provided with an aperture adjacent the bearing and remote from the end plate. The end plate is also provided with a series of apertures and the cooling flow is established between the housing aperture and the end plate apertures. However, these apertures are closely spaced to the axis of rotation of the rotor while the fan blades are positioned to be, and are most effective, remote from the axis of rotation. Thus additional structure, in the form of a conduit or hose, must be added to communicate the rear aperture to a location adjacent the fan blades. This adds cost to the dynamoelectric machine housing and the hose connections create an added problem of reliability in use.

Still another problem which arises from this type of motor having a plastic housing, or for that matter any other form of housing, is that the electrical brushes are normally retained in the end plate and are biased by a resilient means so as to remain in contact with the commutator ring of the armature. In order to maintain a relatively clean environment for the brushes while maintaining a relatively short axial length and relatively simple end plate configuration the brushes are normally retained in an end plate having a generally planer configuration and are arranged on the end plate to be positioned interiorly of the housing when the housing is fully assembled and axially inwardly of the commutator end bearing. This raises considerable complexity of assembly problems since the commutator end bearing, the brush, brush biasing means and commutator ring must be established in assembled relation within the end plate either through the use of special tools and fixtures or prior to insertion of the rotor into the cup-shaped portion of the housing. The latter assembly technique is the more practical. A further problem resulting from the above is the placement and routing of the brush conductor leads to keep them removed from the bearing and from the brush commutator interface. This arrangement also dictates that normal servicing to replace the brushes requires that the dynamoelectric machine be at least partially disassembled.

In forming a plastic housing for the dynamoelectric machines utilizing externally situated permanent magnet stator field assemblies according to the above-noted pending application and issued patents, a further problem resides in the axially non-uniform air gap between the permanent magnets and the rotor. This results from the requirements of plastic molding technology coupled with a housing design which is open on one end for insertion of the rotor. The resulting cup-shaped rotor receiving portion must be provided with a general shape which is convergent, or slightly conical, to permit plastic housing material to flow evenly. The average air gap resulting is thus larger than the minimum and hence is less efficient in an electromagnetic sense. It is therefore a specific object of the present invention to provide a dynamoelectric machine housing which may be formed of a moldable plastic and which is capable of providing a generally cylindrical rotor receiving cavity. It is also an object of this invention to provide such a structure which is easily fabricated without use of expensive molds, machinery or techniques.

In order to overcome the various difficulties briefly enumerated hereinabove, it is a specific object of the present invention to provide a dynamoelectric machine housing configuration which may be easily and conveniently molded of a suitable plastic material and which overcomes the various problems set forth hereinabove. More particularly, it is an object of the present invention to provide a dynamoelectric machine housing structure which provides for means defining ridges or rings suitably situated for retention of the various required armature bearings and which does not require press fitting of the bearings into sockets nor the use of separate bearing retaining structure in order to fixedly locate the armature bearings within the housing. It is also a specific object of the present invention to provide such a structure which allows assmebly of the brush and brush biasing means from the exterior of the housing subsequent to complete assembly of the housing.

It is also a specific object of the present invention to provide such a housing having an integrally molded air flow pipe communicating the interior of the housing in proximity to the rotor to a source of air at a higher or lower pressure to provide a cooling flow of air for the armature structure. It is also an object of the present invention to provide such a housing structure in which the electrical leads may be exterior of the housing. A further object of the present invention is the provision of a housing for a dynamoelectric machine in which the electrical brushes may be inserted from, and serviced from, the exterior of the machine without disassembly of the housing. It is a specific object of the present invention to provide a dynamoelectric machine housing which may be formed of a moldable plastic material and which incorporates the objectives set forth above.

SUMMARY OF THE PRESENT INVENTION

The present invention provides housing structure for a dynamoelectric machine which housing structure is made up essentially of two complementary halves which are joined together along a plane which includes the axis of rotation of the dynamoelectric machine. Bearing retaining structure in the form of molded plastic ridges are provided in each of the two halves of the housing so as to provide full support for the retained bearings about the periphery thereof and on either side thereof when the housing is fully assembled. Each of the two pieces of the housing further includes complementary halves of a cooling air duct which communicates one end of the rotor structure to a point which may be in proximity to a fan driven by the dynamoelectric machine. Each of the moldable halves of the housing structure also includes brush channel means which communicate the exterior surface of the housing section with the interior region of the assembled dynamoelectric machine housing, in proximity to the commutator of the rotor, so as to permit assembly and servicing of the electric brushes after assembly of the housing.

BRIEF DESCRIPTION OF THE DRAWING

FIG. 1 illustrates, in a side elevational view, a dynamoelectric machine having the housing according to the present invention.

FIG. 2 is a sectional view, taken along section line 2—2 of FIG. 1, illustrating one of the aspects of the present invention.

FIG. 3 is a sectional view, taken along section line 3—3 of FIG. 1 illustrating still another beneficial aspect of the present invention and also illustrating one form of assembly of the housing according to the present invention.

FIG. 4 is an elevational view of a partially assembled dynamoelectric machine having a housing according to the present invention.

FIG. 5 illustrates an alternate embodiment by which the dynamoelectric machine housing of the present invention may be held in assembled relation.

DETAILED DESCRIPTION OF THE PREFERRED EMBODIMENT

Referring now to the drawing wherein like numerals designate like structure throughout the various views thereof, FIG. 1 illustrates a side elevational view of a dynamoelectric machine 10 having the housing of the present invention. Dynamoelectric machine 10 is provided with a rotor or armature shaft 12 having the stub end 14 arranged for receipt of further apparatus so that the dynamoelectric machine may perform a useful function. For example, stub shaft 14 may receive a fan so that dynamoelectric machine 10 may become a blower motor. Dynamoelectric machine housing, generally denoted as 16, is provided with a mounting flange portion 18 by which the dynamoelectric machine 10 may be mounted to auxiliary structure, as for example to an air duct, and with a generally cup-shaped rotor receiving portion 20. In order to provide a flow of cooling air to the interior of the dynamoelectric machine 10, air duct or passage 22 is provided communicating the flange 18 with the rear portion of the rotor receiving portion 22. A stator flux path assembly generally denoted as 24 is illustrated, in the presently preferred exterior location, in surrounding relationship to the rotor receiving portion 20 of the housing and is shown to be attached thereto by means of mounting screws or bolts 26.

FIG. 1 also illustrates a plurality of, in this case four, attachment screws 28 which are used in assembling the two pieces of the dynamoelectric machine housing 16 together. Also illustrated in FIG. 1 is electrical brush channel 30 which is arranged to provide for communication of the electrical brush with the commutator of the rotor of the dynamoelectric machine 10. For purposes of clarity, the brush and other apparatus have been removed from the brush channel 30 and commutator segments 31 are shown at the interior of brush channel 30. Brush channel 30 is situated on one axial end of the housing 16 due to placement of the commutator on the rotor shaft 12. In this case, it is situated on the left hand side, relative to FIG. 1, of the mounting flange 18 so that terminal feed through means 32 are provided on the mounting flange 18 to provide electrical communication between the left hand side of mounting flange 18 (which would be for example interior of an air duct) and the right hand side of mounting flange 18. The dynamoelectric machine 10 may therefore be electrically communicated to a source of energy, not shown.

Referring now to FIG. 2, a sectional view taken along section line 2—2 of FIG. 1 illustrates the cross sectional view of the rotor receiving portion 20 of the dynamoelectric machine 10 having the housing 16 according to the present invention. As illustrated in FIG. 2, the housing 16 is comprised of complementary first housing portion or section 34 and second housing portion or section 36 which are joined together by the mounting screws 28 (as shown in FIG. 1). Stator flux producing structure 24 is comprised of first and second flux return path members 38 and a plurality, in this case four, of permanent magnets 40 which are arranged to provide the stator flux and may be for example the well known ceramic permanent magnets which are radially polarized. A more detailed description of this structure may be found in the above-noted copending patent application Serial No. 223,636. As illustrated in FIG. 2, the rotor receiving housing portion 20 provides a generally cylindrical rotor receiving cavity 42 from which the rotor has been removed for purposes of clarity of this view. The rear wall of cavity 42 is defined by the largest of a plurality of concentric circular structures 44, 46 and 48. The smallest of these, 48, corresponds with the extreme right hand projection of the rotor receiving housing portion 20 and is intended to accommodate without obstruction the right hand end of armature shaft 12. The circular ridge 46 comprises the lip of the axially inward portion of the bearing retaining means for the extreme right hand bearing (relative to FIG. 1) and formed in accordance with the teachings of the present invention. The circle demoted as 44 defines the base of the axially inward bearing retaining ridge means 45. Further discussion directed to this aspect of the present invention is contained hereinbelow with reference to FIG. 4. As can be seen from this view, the stator flux path generating means 24 are coupled to the rotor receiving housing portion 20 through the use of mounting screws 26 which are received within screw retaining clips 50. Each housing portion or half 34, 36 is provided with a pair of diametrically opposed, axially centrally disposed tab portions or projections 52 which are arranged to be in cooperating confronting relation to complementary tab portions and to overlay a portion of the housing structure to define a clip receiving recess and each of the flux path members 38 is apertured as at 54 to permit passage of the mounting screws 26. Housing portions or halves 34, 36 further include a plurality of ribs 56 which are operative to receive and circumferentially define the positions of the permanent magnets 40 of the stator flux generating means 24. Seal means 58 are further provided to assure sealing between the housing portions or halves 34, 36. The seal means 58 may be formed separately from the housing portions 14, 36 or may be formed as a tongue and groove connection between the adjacent housing portions.

As shown in this view, the air conduit 22 is a hollow conduit which is in this view spaced apart slightly from the central portion 20 of the housing. The air conduit 22 is comprised of a pair of suitably shaped wall portions formed integrally with the housing sections 34, 36 and interconnecting the flange wall portions with the rear, or right hand relative to FIG. 1, portion of the central housing portion 20. Each of these wall portions is shaped so that upon joining of the housing sections 34, 36 to form a complete housing, the wall portions will define a conduit. In the illustrated embodiment, the wall portions are formed to have a semi-circular cross section and thus produce an air conduit having a circular cross section. It will be appreciated that the shape selected for these wall portions may be any convenient shape compatible with the molding technique utilized. The seal means 58 assure the desired air flow. The housing portions 34, 36 are formed from a plastic material which may be either a thermoplastic or a thermosetting plastic. The plastic housing portions 34, 36 may be formed by any suitable plastic forming technique such as injection molding, compression molding and vaccum forming. Each housing portion 34, 36 is arranged to have an opening in a plane, denoted by the line identified by numeral 35, which includes the axis of rotation of the dynamoelectric machine rotor. Thus, those elements of the housing which are radially symmetric with respect to the axis of rotation of the rotor such as the armature bearing retaining means may be equally and uniformly distributed between the two housing portions 34, 36. Other housing structure which is not necessarily radially symmetric with the axis of rotation such as the electric terminal feed through means 32 and the cooling air duct 22 may be made bilaterally symmetric with respect to a selected plane so that forming the housing in accordance with the teachings of this invention permits those parts which may have bilateral symmetry to be evenly and conveniently distributed between the two housing portions 34, 36. This permits formation of the housing 16 through simple and direct plastic formation without resort to complex dies or molds while providing, as integral housing structure, many features which had previously required the use of additional or add-on components.

Referring now to FIG. 3, a portion of the dynamoelectric machine 10 according to FIG. 1 is illustrated in a sectional view taken along section line 3—3 of FIG. 1. This view illustrates the relation between the electrical brushes 60 situated within their respective brush channels 30, 30a. A commutator 62 is shown in phantom lines and the brushes are illustrated as being biased into contactive engagement with the commutator ring 62 by resilient means 64 operating against clip members 66. While the clip members are illustrated as being of the type described and claimed in my copending commonly assigned patent application Ser. No. 362,628, other well known forms are suitable and their use is contemplated. Electrical leads 68 communicate the clip members 66 with terminal members 70 which are shown positioned to electrically communicate the brushes through the flange 18. The flange 18 is not illustrated in this view for purposes of clarity. As shown in this view, the housing halves 34, 36 are held in assembled relationship through the cooperation of mounting pins 28 which extend through suitably provided bores or passages and are held in place by mounting clips 72. From a consideration of the views of FIGS. 1 and 3, it can readily be seen that brush channels 30, 30a communicate the commutator 62 to the exterior of the housing 22 in such a fashion that the brushes 60 may conveniently be inserted therein and subsequently biased toward the commutator ring 62 through the cooperative coaction of resilient means 64 and clip members 66 after the housing pieces 34, 36 have been mounted in assembled relationship.

Referring now to FIG. 4, the dynamoelectric machine 10 according to the present invention is illustrated in a view similar to that of FIG. 1 but in which the housing body portion 34 has been removed. Thus, FIG. 4 illustrates housing portion 36 in a side elevational view and with the rotor structure, generally designated 72 and including armature shaft 12 received within the central body portion 22 of the housing portion 36. Armature 72 is of conventional construction and further description is not deemed to be necessary. As illustrated in this view, housing body portion 36 is provided with means defining armature bearing receiving structure denoted generally by the numerals 74 and 76. This structure is adapted to receive armature bearings 78 which are mounted on the armature shaft 12 in conventional manner to permit rotation of the shaft 12 relative to the housing 16. Bearings 78 may be of conventional design which may include for example ball bearings. The significant aspect of the bearing retaining structures 74, 76 resides in the provision of axially outer bearing retaining wall portions 80 which define the outer axially extreme bearing position and axially inner bearing retaining wall portions 82 which define the inner axial extreme bearing position. The inner bearing retaining wall portions 82 have an armature shaft aperture defined by lip or ridge 46. The inner and outer bearing retaining walls 82, 80 respectively are formed, in the illustrated embodiment, by semi-circular ridges of housing material during the housing molding processing and in cooperation with complementary ridges on the mating housing portion 34 will define substantially circular bearing retention wall means for receiving and confining the bearings 78 therebetween. An alternative construction would have the retaining walls, for example the inner walls 82, formed of discontinuous ridge comprising a plurality of projections or teeth which would nevertheless cooperate with complementary structure on the mating housing portion to define a surrounding retaining structure for the bearings 78 situated about substantially 360° of the bearings 78. By providing the housing portions 34, 36 with an opening along a plane which includes the axis of rotation of the resultant dynamoelectric machine 10, the armature 72 and particularly the bearings 78 may be conveniently placed within the armature cavity 42 so that each bearing 78 is situated intermediate an axially outer retaining wall portion 80 and an axially inner retaining wall portion 82. Furthermore, the addition of the mating housing portion will encapsulate and confine the bearings without the use of special inserts, retaining rings or compression insertion of the bearings 78 within the housing 16.

As illustrated in this view, the housing portion 36 is provided with a groove 84 about the air conduit 20 and about a major portion of the rotor 72. Such a groove is not provided in the vicinity of the commutator ring 62 in view of the fact that this region is normally provided with a series of apertures so that the air flow provided by pressurization of duct 22 may be exhausted from the interior 42 of the housing 16. From a consideration of the views of FIG. 4, it can also be seen that the rotor receiving cavity 42 provided by the central portions of the housing sections 34, 36 formed in accordance with the teachings of this invention also provides for an axially uniform air gap between the stator flux producing means 24 and the armature 72. Furthermore, this air gap can be provided at a minimum spacing consonant with permanent magnet dynamoelectric machine design since the central housing portions forming the rotor receiving cavity 42 are not required to be axially convergent or divergent.

Referring now to FIG. 5, in a view similar to that of FIG. 2, an alternate assembly technique for the stator flux field producing structure 24 is illustrated. According to this view, spring clip members 86 similar to those illustrated and claimed in my above U.S. Pat. No. 3,766,418 are used to provide for flux path integrity. This construction has the additional advantage that mounting screws 26 and screw receiving clips 50 and the associated housing structure may be eliminated. Additionally, the stator field producing structure 24 and in particular spring clips 86 may be arranged to provide the totality of the force required to maintain the housing pieces 34, 36 in assembled relationship.

The present invention may therefore be seen to accomplish its stated objectives. By defining a complete dynamoelectric machine housing which is separated into two complementary portions by a plane passing through the axis of rotation of the armature, housing structure having radial symmetry may be conveniently formed integral with the housing. This permits elimination of, for example, special bearing retaining structure and results in improved ease of assembly. Furthermore, the housing portions may be arranged to include complementary portions having bilateral symmetry such as the brush channels, air ducts and electrical feed throughs thereby improving ease of forming the housing portions out of moldable plastic material. By utilizing a housing configuration which receives the armature by lateral rather than axial insertion, the relatively complex end plate structure which includes bearing retaining structure and electrical brush conduit structure can be eliminated and replaced with comparable structure integrally formed with, part of, the housing portions to the advantage that assembly of the dynamoelectric machine is improved, the number of required pieces is reduced, component protection is provided and external loading of the electrical brushes is now practical.

I claim:

1. A molded housing for receiving and supporting the armature bearings and rotary armature of a dynamoelectric machine wherein the rotary armature includes means forming an electric commutator positionable in proximity to, and axially inwardly of, one of the armature bearings comprising:

first and second molded housing sections joinable in a plane, said joining plane arranged to include the axis of rotation of the armature;

each housing section having a central portion arranged to define substantially one-half of a rotor receiving cavity;

a first pair of bearing retaining ridge means formed in said first housing section central portion, the members of said first pair being at locations axially remote from each other;

a second pair of bearing retaining ridge means formed in said second housing section central portion, the members of said second pair being at locations axially remote from each other;

the members of said first pair of ridge means being spatially arranged to cooperate with the members of said second pair of ridge means, upon joining of said first and second housing sections, to define first and second axially inwardly located bearing retaining walls, said bearing retaining walls providing substantially 360° of position defining surrounding support for the armature bearings means for maintaining said first and second housing sections joined in assembled relation; and wall means defining first and second electrical brush channels directed generally perpendicularly to the joining plain and situated in proximity to, and axially inwardly of, one of said first and second bearing retaining walls, said first and second brush channels arranged to provide communicating passages from the exterior of said first and second housing sections to the interior of the housing in proximity to the armature commutator whereby electrical brush assembly and servicing may be accomplished which the dynamoelectric machine housing remains assembled.

2. The dynamoelectric machine housing of claim 1 wherein each of said first and second housing sections further includes an integrally formed mounting flange portion, the mounting flange portions on said first and second housing sections being cooperative to form a substantially continuous mounting flange member, and a shaped wall member interconnecting the mounting flange portion with the central portion of the housing section, said first and second housing section shaped wall members being cooperative upon joining of the first and second housing sections to define an enclosed cooling air conduit for communicating a flow of cooling air from a point remote from the axis of rotation of the armature to a point proximate the rotor receiving cavity.

3. The dynamoelectric machine housing according to claim 2 wherein said first and second housing section central portions are provided with means for receiving the permanent magnets of a stator flux producing means situated on the exterior of the central portions and said central portions are arranged to provide for a generally cylindrical rotor receiving cavity whereby the air gap between the permanent magnets and the armature may be made axially uniform.

4. The dynamoelectric machine housing of claim 3 wherein said first and second housing section central portions are provided with a pair of diametrically opposed, axially centrally disposed, tab portions, said tab portions arranged to be in cooperating confronting relation when said first and second housing portions are joined in assembled relation to define stator assembly mounting screw clip receiving recesses.

5. The dynamoelectric machine housing of claim 3 wherein the stator flux producing means include a pair of cooperating flux path members held in assembled relation by a pair of spring clip members and said means for maintaining said first and second housing sections joined in assembled relation comprise the flux path members and the spring clip members.

* * * * *